Oct. 20, 1931.  C. ENDORF  1,828,400

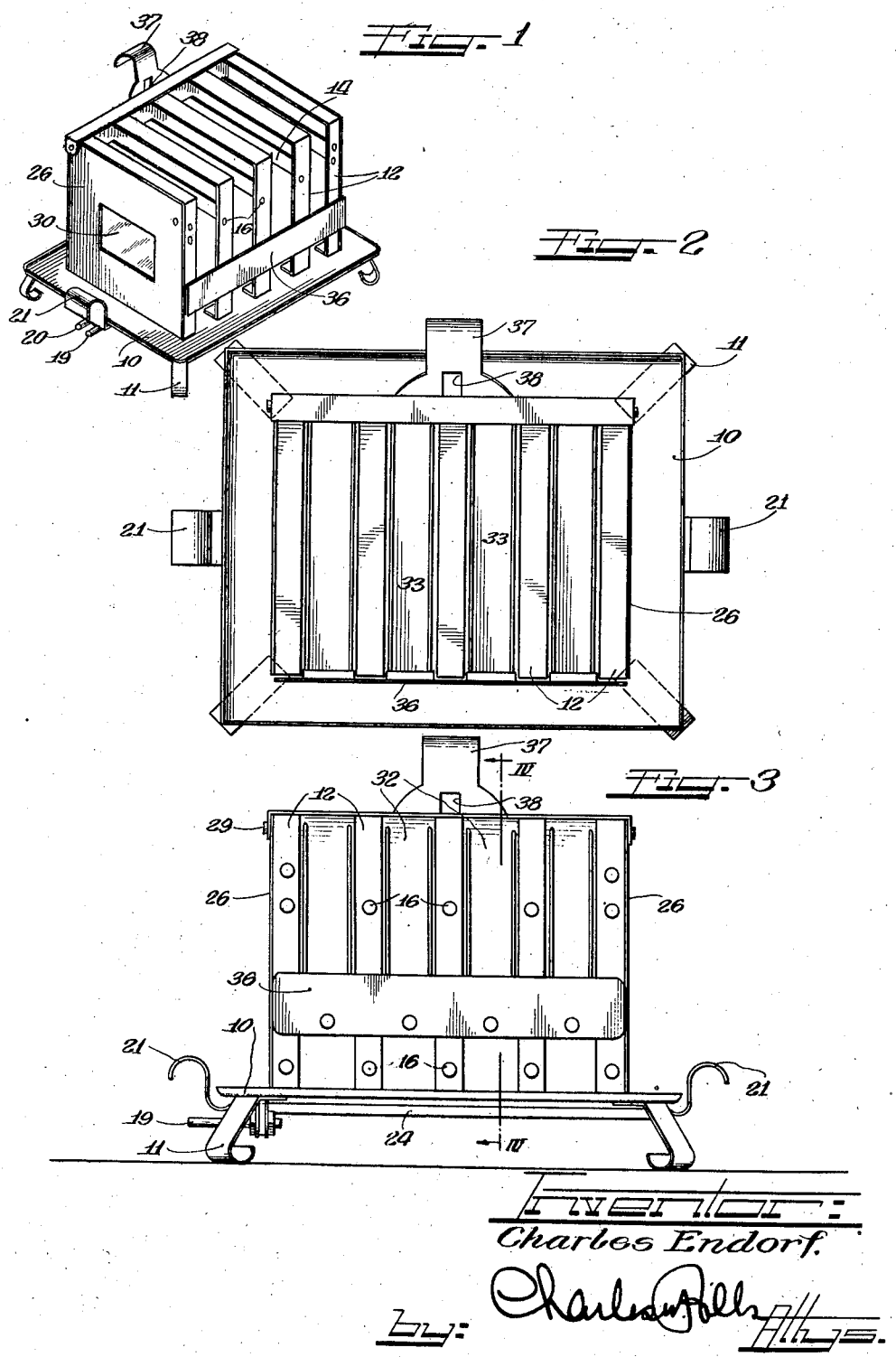

TOASTER

Filed Jan. 20, 1930  2 Sheets-Sheet 2

Inventor:
Charles Endorf.
by: Charles Mills Attys.

Patented Oct. 20, 1931

1,828,400

UNITED STATES PATENT OFFICE

CHARLES ENDORF, OF CHICAGO, ILLINOIS

TOASTER

Application filed January 20, 1930. Serial No. 421,898.

This invention relates to improvements in toasters and the like, and more particularly to electrical devices of this character, the invention being highly desirable for use in connection with the toasting of bread and similar substances, although the same may have many and various uses as will be apparent to one skilled in the art.

In the past, many and various designs and types of toasting devices have been developed, but for various reasons these formerly known devices have proven objectionable. In many cases the devices were objectionable because they toasted only one side of the bread or other substances at a time. In other cases, the devices were objectionable due to the difficulty experienced in removing the bread from the toaster. In still other instances, toasters have been developed which, after the bread or other substance has toasted a certain length of time, automatically shut off the current, and even go to the extent of partially ejecting the toast or at least elevating it slightly so that a portion of it will be visible to the user. However, it is quite apparent that when a toaster automatically shuts off the current, the toast will quickly cool if left within the toaster, while on the other hand, where toasters used heretofore do not shut off the current, the toast must be removed very expeditiously or it will burn. In other words, with devices of this character now in use and heretofore known, the consumer of toast must adjust his course of eating conformable with the oddities of the particular toaster in use; while, obviously, the ideal arrangement is for the toaster to perform perfectly in accordance with the whims and desires of the consumer.

The present invention has been designed to overcome the above noted as well as other defects and objections in the provision of a toaster designed to properly toast a multiplicity of slices of bread or other substances simultaneously on both sides thereof, and which, by a simple adjustment, will keep the toast warm without burning until the user is ready for it.

Another object of this invention is to provide a toaster wherein there is a uniform and fair distribution of heat throughout the interior of the toaster.

It is another object of this invention to provide a toaster which, though having closed ends, yet affords a good view at all times of the progress of toasting even of the substances next adjacent the ends.

Still a further object of this invention is the provision of a toaster equipped with novel and efficient means for ejecting the toast therefrom.

It is still another object of this invention to provide a toaster embodying a novel carriage for the substance to be toasted, which carriage may be elevated, automatically retained in this position, and when released will assume its normal position for toasting due to the action of gravity.

While some of the more salient features, characteristics, and advantages of a device embodying this invention have been above pointed out, others will become apparent from the following disclosures.

The invention includes these and other features of construction and combinations of parts hereinafter described, and shown in a preferred form in the drawings, as more particularly indicated by the claims.

On the drawings:

Figure 1 is a perspective view of a toasting device embodying principles of the present invention.

Figure 2 is an enlarged top plan view of the structure shown in Figure 1.

Figure 3 is a front elevational view of the toasting device.

As shown on the drawings:

In the illustrated embodiment of this invention, there is shown a toaster designed primarily for the toasting of slices of bread, although it is to be distinctly understood that the invention may, by obvious modification, be designed for toasting sandwiches and various other food substances. In this particular instance, also, the toaster illustrated will accommodate four slices of bread which are toasted simultaneously on both sides thereof, and it is equally obvious that the toaster may be designed to accommodate any desired number of slices.

The toaster, in this instance, includes a base 10 which is supported by legs or feet 11 in spaced relationship to the object upon which the feet rest, whereby there will be an adequacy of ventilation beneath the toaster. The feet are preferably bent pieces of metal, although they may be of any other desirable material.

Figure 4:
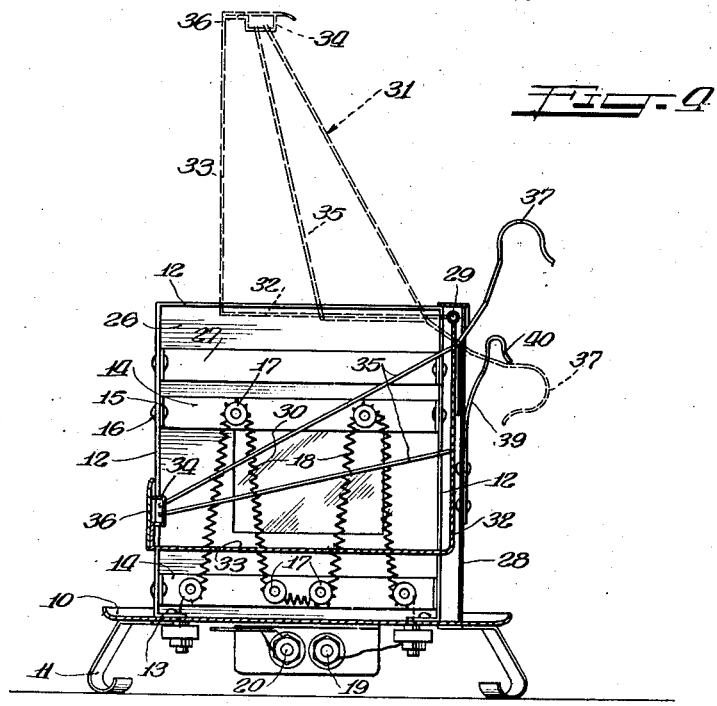
Figure 4 is a vertical sectional view taken substantially as indicated by the line IV—IV of Figure 3, and showing the operation of the carriage.
Figure 5:
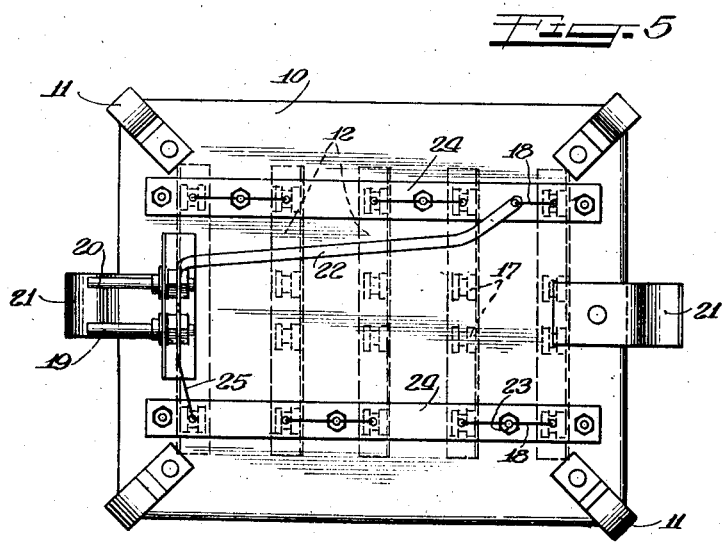
Figure 5 is a bottom plan view of the device, showing the wiring system therefor.

Mounted upon the base 10 is a plurality of frames 12, each of which, as seen more clearly in Figure 4, comprises a substantially U-shaped member having inwardly turned feet 13 secured to the base in any desired member as by a bolt or rivet. Each of the frames 12 also includes a plurality, in this instance two, of widely spaced transverse cross members or slats 14 provided with inwardly turned feet 15 which are secured by means of rivets 16 to opposite portions of the respective frame. Each of the slats 14 carries a plurality of spaced pegs or buttons 17 of insulating material, the buttons being preferably grooved as seen more clearly in Figure 5. Wound, substantially successively around upper and lower pegs or buttons 17, is a heating element 18, preferably the customary resistance wire element, which may be sectioned so that one length thereof will supply one frame, or which preferably is continuous throughout the toaster. The heating element 18 on the frame structure has the configuration of a coiled spring, while underneath the base, it is a plain straight conductor.

Current is supplied to the toaster, in this instance, through a pair of contact elements 19 and 20 respectively, over which a plug may be slipped, the plug being connected to any suitable source of current. The contactors 19 and 20 are preferably disposed beneath one of a pair of opposed handles 21 by which the toaster may be moved from place to place. A link 22 of conductive material, on the under side of the base 10, of course, is connected to the contactor 20 at one end thereof and at the other end to the heating element 18, which passes through a suitable aperture in the base, around the buttons 17 on the first or end frame 12, and descends through another suitable aperture on the opposite side of the base. The heating element, again in its straight conductor form, is secured by means of a connector 23 to the under side of a strip 24 of insulation, passes upwardly through another aperture, assumes its coiled spring formation, and winds around the pegs on the next adjacent frame, coming down through an aperture on the opposite or original side of the base, and so on around each of the frames until a conductor 25 connects this heating element with the second contactor 19. When the current is applied to the contactors 19 and 20, obviously the heating element will become hot, and due to the substantial open construction of the frames 12, there will be an even and thorough distribution of heat through the toaster, the insulating strips 24 upon the base preventing any injury from heat in this portion of the toaster or drown its circuit. End or outermost frames 12 are provided, in this instance, with a side wall 26 which is attached to an auxiliary slat 27 (Figure 4) associated with each of the outer frames. A back member 28, preferably integral with the end walls 26, is provided at the rear of the frames 12 and supports a shaft 29 for a purpose that will later appear herein. Each of the end walls 26 is provided with an aperture therein which is covered by a substantially transparent pane 30 through which the heating element and substance being toasted may be observed at all times.

For supporting the slices of bread or other substances, a carriage, generally indicated by numeral 31 in Figure 4, is provided which is pivotally mounted adjacent the normal upper portion thereof on the shaft 29 carried in the side or end walls 26. This carriage 31 comprises a plurality of individual holders for a slice of bread, each holder including a back member 32 and a bottom member 33 preferably integral therewith. The front portion of each of the bottom members 33 is turned upwardly and bent to form a channel 34 (Figure 4) adjacent each end of which a pair of wires 35 are secured, the other ends of the wires being secured to the corresponding back member 32. Each of the individual holders on the carriage is of a size just sufficient to be received in the space between any two adjacent frames 12, there being shown in the drawings four spaces and consequently four holders on the carriage. Across the front of the channel portions 34 a continuous plate 36 is provided which, when the carriage is in its lowered position, (i. e. between the frames 12) abuts the front portions of the frames to limit the downward movement of the carriage.

The means for elevating the carriage, in this instance, include a handle 37 which is secured to the rear portion of the carriage below the pivot point 29, whereby the carriage will swing outwardly as well as upwardly when the handle is pressed downwardly. This handle is provided with a suitable slot 38 therein which, when the handle is pressed downwardly, receives therein the upper portion of a spring leaf detent 39 secured to the back wall 28 of the toaster. The detent has a downwardly turned end 40 thereon which springs outwardly and engages the handle beyond the aperture 38 so as to hold the carriage in raised position as shown by the dotted lines in Figure 4. When it is desired to again drop or lower the carriage, it is simply necessary to push the end 40 of the detent inwardly toward the toaster and permit the carriage to fall.

In operation, the present invention is extremely simple and quite efficient, permitting the consumer of the toast to govern the toaster in accordance with his own particular whims and desires relative to eating. The slices of bread may be put into the toaster either when the carriage is in its elevated or lowered position. Assuming that the carriage is lowered, into the position shown in Figure 1 of the drawings, four slices of bread may be dropped into the respective individual holders on the carriage, and the current supplied to the heating element. Due to the openness of the holders on the carriage and the openness of the frames carrying the heating element in the toaster, there will be a uniform and thorough circulation of heat through the device, and when the bread has been sufficiently toasted, it is simply necessary to press the handle 37, which will always remain cool, downwardly and thus elevate the carriage. The toasted slices will then rest upon one of their initially side edges on the back portions of the carriage which will now be substantially horizontal above the heating element within the toaster. The toast may be left in this position indefinitely and as long as the current is left on, the heating element will keep the toast nicely warm without burning the same. When it is desired to use the toast, it is a simple expedient to lift the slices from their respective holders in the carriage.

From the foregoing, it will be apparent that I have provided an efficient and quite easily operable toaster, which not only toasts a plurality of slices of bread or other substances simultaneously on both sides thereof, but also permits the toast to be elevated and kept warm indefinitely without any danger of burning. It is also to be noted with regard to this invention that if a plate is set adjacent the rear of the toaster and the carriage elevated by a quick pressure upon the handle 37, the toast will be ejected onto the plate. Moreover, the present toaster is pleasing in appearance, durable, and may be economically manufactured. In addition, the open construction insures a uniform distribution of heat, and when the slices are between the frames 12 this heat is concentrated evenly over the bread.

I am aware that numerous details of construction may be varied through a wide range without departing from the principles of this invention, and I, therefore, do not purpose limiting the patent granted, otherwise than necessitated by the prior art.

I claim as my invention:

1. In a toaster, a base, a back member rising from said base, a pair of spaced frames carrying heating means on said base in front of said back member, and a carrier for a slice of bread pivoted to said back member and normally disposed between said frames, means for pivoting said carriage above said frames, and means for maintaining said carriage in elevated position, whereby the toasted bread may be kept warm without burning until utilized.

2. In a toaster, a plurality of spaced frames carrying heating means, a back member adjacent a side of said frames, a carriage pivoted to said back member and including a plurality of individual holders for substances to be toasted, a handle on said carriage for pivoting the same upwardly until the back of said carriage lies substantially even with the tops of said frames, and means for automatically holding said carriage in the position until released.

3. In a toaster, a frame, a holder for a substance to be toasted, said holder being pivoted to said frame, means for moving said holder about the pivot, said means being attached to said holder and including a handle, a relatively stationary cam attached to the frame below said handle and engageable by said handle as the latter is depressed whereby, upon depression, said handle slides and pivots about said cam and said holder is raised, said handle having a slot for receiving said cam when the holder is in elevated position, a yieldable detent adjacent said cam and adapted to snap over an end of said slot as the handle is depressed to thereby releasably maintain the holder in elevated position.

4. In a toaster, a frame, a holder for a substance to be toasted, said holder being pivoted to said frame, means for moving said holder about the pivot, said means being attached to said holder and including a handle, a relatively stationary cam attached to the frame below said handle and engageable by said handle as the latter is depressed whereby, upon depression, said handle slides and pivots about said cam and said holder is raised, said handle having a slot for receiving said cam when the holder is in elevated position, a yieldable detent adjacent said cam and adapted to snap over an end of said slot as the handle is depressed to thereby releasably maintain the holder in elevated position, said handle and the portion of said means attached to said holder being oppositely disposed relative to the first mentioned pivot.

5. In a toaster, a frame, a holder for substance to be toasted, said holder being pivoted to said frame, means for moving said holder about the pivot, said means being attached to said holder and including a handle, a relatively stationary abutment attached to said frame below said handle and engageable by said handle as the latter is depressed whereby, upon depression, said handle slides and pivots about said abutment and said holder is raised, and detent means carried by said frame for supporting said holder in elevated position.

In testimony whereof I have hereunto subscribed my name at Chicago, Cook County, Illinois.

CHARLES ENDORF.